May 28, 1963 V. J. PISCITELLI 3,091,034
DENTAL MIRROR
Filed Jan. 16, 1961 2 Sheets-Sheet 1

Inventor
Vincent J. Piscitelli

By Hill, Sherman, Meroni, Gross & Simpson Attys

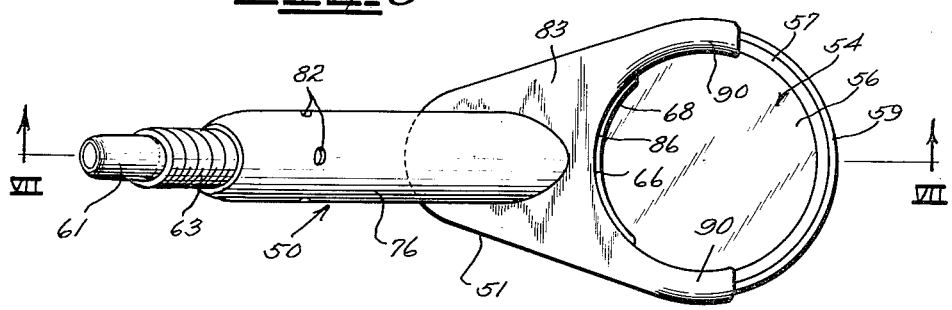
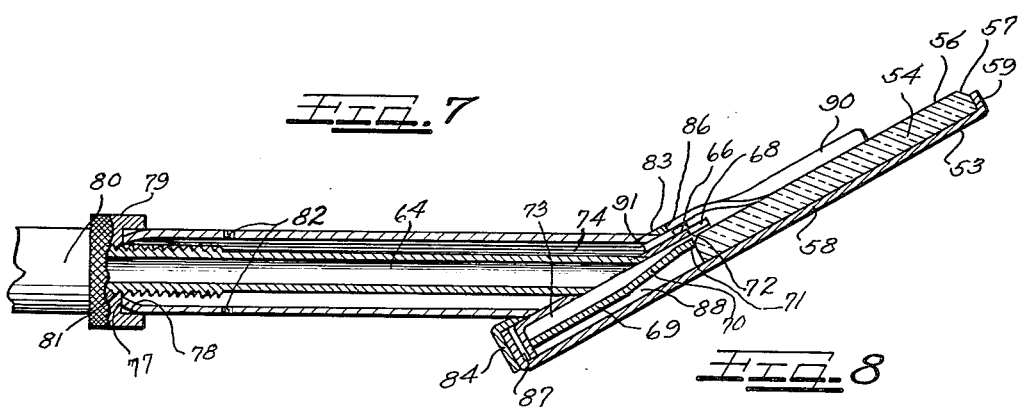
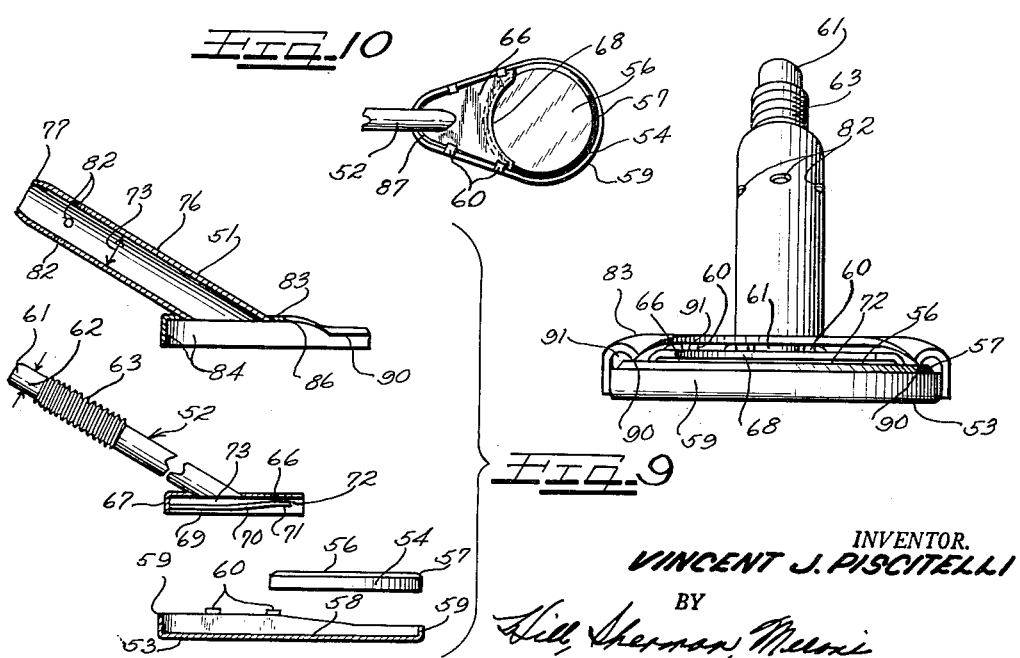

United States Patent Office 3,091,034
Patented May 28, 1963

3,091,034
DENTAL MIRROR
Vincent J. Piscitelli, 828 1st St., La Salle, Ill.
Filed Jan. 16, 1961, Ser. No. 83,353
19 Claims. (Cl. 32—69)

This invention relates to dental instruments, and more particularly to a dental mirror including air nozzle means providing an air shield which positively prevent material such as the mist and water propelled from high speed and ultra high speed rotary drills from collecting on the mirror surface and which draws air from the underside of the mirror by the action of the air directed over the mirror to render the air shield highly effective.

The present invention is a continuation-in-part of my abandoned application Serial No. 831,408, filed August 3, 1959, which is, in turn, a continuation-in-part of my application No. 794,592, filed February 20, 1959, on "Dental Instrument" now Patent No. 3,027,644. I have found that the action of the dental tool disclosed in that application was rendered more effective when the partial vacuum condition created by the passage of air from the nozzle over the mirror face was such as to draw air and other materials from beneath the mirror.

Since my invention utilizes the principles of the venturi to increase the velocity of the air that passes through the nozzle, a pressure differential is developed as the air leaves the nozzle in accordance with the principles developed by Bernoulli, and consequently a vacuum is created around particular areas of the mirror. The location of this vacuum condition I have found to be dependent in part upon the placement of the nozzle relative to the mirror face. Although my instrument, as set forth in my said copending application, in general affords a shield of air which is effective in affording clear reflecting action during dental operations in a manner not possible with preceding instruments, I have discovered that placing the nozzle close to the edge of the mirror draws air from beneath the mirror and improves the shielding action at the upper face of the mirror by eliminating vacuum areas which might otherwise permit some materials to be deposited on the mirror. In accordance with my invention, I also provide conduit or duct means for drawing the air from beneath the mirror in this manner.

In practice, the beneficial results of the air curtain, plus the vacuum, is independent of the actual physical location from which the vacuum is drawn. In other words, the vacuum can be drawn from behind the mirror or above the mirror, or from beneath the mirror, or a combination of the various locations.

Accordingly, it is an object of the present invention to provide a dental instrument which is exceptionally effective in protecting the surface of the mirror under all operating conditions.

Another object of the invention is to provide a dental instrument as described wherein the air is lead from a location adjacent the mirror by air directed across the face of the mirror to afford a reliable shielding action for the mirror face.

Yet another object of the invention is to provide conduit means for leading the air from adjacent a dental mirror to the location adjacent nozzle passages for directing the air across the face of the mirror so as to improve the efficiency of the device.

Other objects and advantages of the invention will become apparent as the description proceeds in accordance with the drawings, in which:

FIGURE 6 is an elevational view of an alternative form of dental instrument embodying the principles of the invention;

FIGURE 7 is a cross-sectional view taken on line VII—VII of FIGURE 6;

FIGURE 8 is a front elevational view of the dental instrument of FIGURES 6 and 7;

FIGURE 9 is an exploded view of the instrument of FIGURES 6–8; and

FIGURE 10 is a fragmentary plan view of a sub-assembly of certain components of the dental instrument to illustrate additional details of construction.

Figure 1:
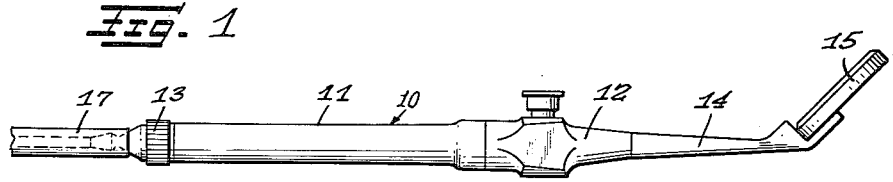
FIGURE 1 is a side elevational view of a dental instrument according to the present invention.
Figure 2:
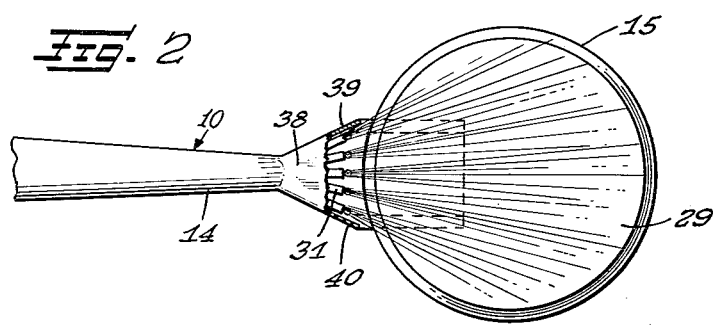
FIGURE 2 is an enlarged top plan view of the end of the dental instrument shown in FIGURE 1 with parts broken away to show additional details of structure.

Referring now to the drawings, a dental instrument is shown in FIGURES 1 through 4 according to the present invention, which is designated generally by reference numeral 10, and comprises an elongated handle 11 having a valve fitting 12 threadedly secured thereto at one end thereof, a conduit nipple 13 threadedly secured thereto at the other end thereof and a nozzle 14 threadedly secured to the valve fitting 12. The nozzle 14 also provides a bracket for a mirror 15. As shown more particularly in FIGURE 3, the handle structure 11 has formed therethrough a bore 16 in communication with a suitable hose 17 resiliently engaging the nipple 13 of FIGURE 1. The bore 16 is configured at the end opposite the fitting 13 so as to threadedly receive a valve 18, which in itself may be relatively conventional in construction and is preferably similar to a tire valve element.

In order to control the valve 18, the valve fitting 12 has a transverse cylindrical chamber 19 formed therein in communication with the reduced end of the bore 16 receiving the valve 18, the fitting also defining a passage 20 leading from the chamber 19 to the nozzle 14. A valve actuating button 21 is slidably received in the chamber 19 which includes a cylindrical body portion 22 having an inverted conical camming surface 23, a centrally depending actuating rod 24 and a circular guide and latch plate 25 formed integrally on the end of the rod member 24 in coaxial perpendicular relationship thereto. The button 21 may have a bearing surface 26 of relatively wide diameter and a peripherally resilient annular stub member 27 surrounding the cylindrical body portion 22 in abutting engagement with the bearing structure 26 as shown.

Figure 3:
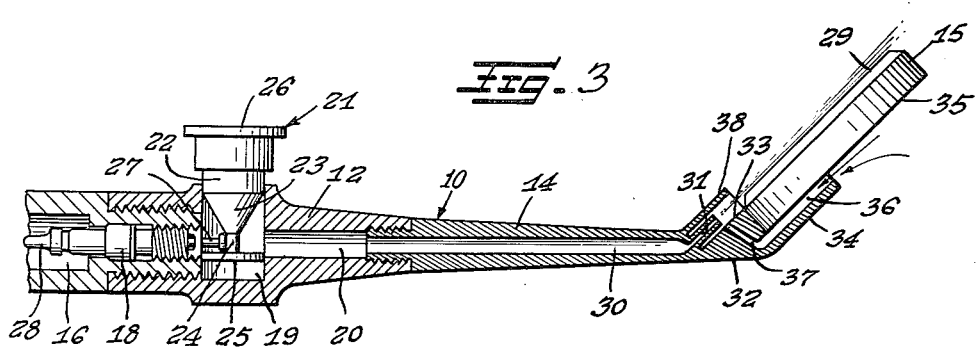
FIGURE 3 is an enlarged vertical sectional view of the end of the dental instrument of the invention as shown in FIGURE 1.

In the inoperative position shown in FIGURE 3, the locking plate 25 engages a valve pin 26 for the valve 18 so that the button 21 is retained from accidental movement out of the valve fitting 12. When the button is manually depressed, however, the camming surface 23 will move the pin 27 into the valve 18 to open the valve against resilient means contained therein (not shown) and to move the valve cap 28 off its valve seat as understood by those skilled in the art.

In order to direct a shield of air across the upper face 29 of the mirror 15, the nozzle member 14 defines a bore 30 in communication with the bore 20 and the valve fitting 12 and a plurality of nozzle passages or conduits 31 leading upwardly from the passage 30 in generally parallel relationship to the mirror face 29. Desirably, the passage 30 may be convergent and the passages 31 are of reduced diameter in order to increase the velocity of flow therethrough according to the principle of a venturi. The passages 31 also fan outwardly relative to one another in divergent relationship so that the air may expand across the mirror face as shown.

In accordance with the invention, the ends of the nozzle passages 31 are spaced from the mirror face 29 a predetermined distance such that the pressure conditions produced by the high velocity of the air as it emanates from the passages effect a vacuum condition in back of the mirror adjacent the nozzle structure 14. This vacuum condition will tend to draw air from beneath the mirror; and it is apparently this action which improves the air shielding and overcomes the problem created by the venturi action of the nozzle wherein the vacuum may tend to permit water or other materials to collect on the mirror face 29 when the nozzle is not located as herein set forth.

The invention provides for positively directing the air along the bottom of the mirror to a location immediately in front of and just below the ends of the nozzle passages 31 where the aforementioned vacuum condition prevails, thereby to relieve any vacuum condition across the face of the mirror and maintain the effectiveness of the air shield. Accordingly, a shelf structure 32 is formed integrally with the nozzle and bracket structure 14, with its surface extending parallel to the upper face 29 of the mirror and preferably in substantially coplanar relationship therewith.

The means for directing the flow of air from beneath the mirror to the terminal portions of the nozzle passages 31 comprise a bracket shelf 33 preferably formed integrally with the nozzle 14 and having a bottom inner wall 34 spaced from the bottom wall 35 of the mirror and relatively widely spaced side walls 36 defining with the bottom wall 34 and the bottom of the mirror 35 a flow conduit extending forwardly from the rear of the mirror a distance which is preferably less than half the diameter of the mirror. A plurality of passages 37 extend from the inner end of the conduit thus formed in back of the mirror to the upper surface of the shelf 32 to terminate in proximate, spaced relation to the ends of the passages 31. Thus the vacuum action is effective to draw air constantly through the passages 37 so that air is drawn from adjacent the mirror, in this instance upwardly from beneath the mirror during the normal operation of the mirror. Such action improves the baffling function of the air shield. A hood 38 may be formed in surrounding relation to the nozzle conduits 31 and having side walls 39 and 40 integral with the shelf 33 to further assure an effective drawing action.

Any suitable source of compressed air may be utilized for introducing a desirable flow of air through the hose 17, and the invention permits the ordinary compressed air facilities to be found in the dentist's office to be used for this purpose. The venturi action described effects a sufficient velocity of the air at its exit from the nozzle passages 31 to maintain the effectiveness of the air shield over the entire mirror surface.

Figure 5:
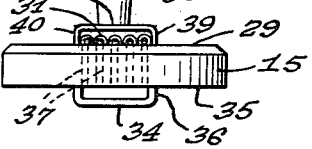
FIGURE 5 is a side elevational view of an alternative structure embodying the invention.
Figure 4:
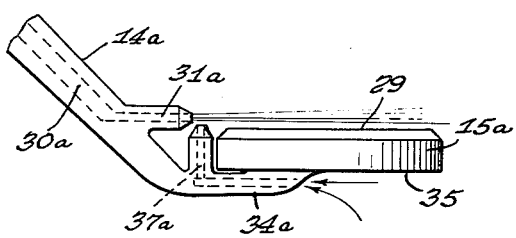
FIGURE 4 is a front elevational view of the dental instrument of the invention.

Referring now to FIGURE 5, a second embodiment of the invention is shown wherein similar parts are generally similarly numbered and wherein one or more nozzle passages 31a are formed by protruding nozzles separated from the nozzle structure of the perpendicularly aligned corresponding number of passages 37a leading air from beneath the bottom of the mirror. The passages 37a can also be formed in a separate nozzle manifold and it will be seen therefore that the greater area thus afforded for the vacuum condition produced by the air emanating from the nozzle passages 31a will enhance the efficacy of the venturi action in drawing air from beneath the bottom of the mirror 15a.

In the alternative embodiment of FIGURES 6-10 a structure is shown which is similar to the invention already described but wherein the physical shape of the parts lends itself to production and fabrication methods and wherein the parts are readily assembled and disassembled and simplified to facilitate sterilization, etc.

Thus, the instrument is shown generally at 50 and the working end of the instrument, as shown in the exploded view of FIGURE 9, constitutes four principal parts designated respectively at 51, 52, 53 and 54.

The part 54, of course, constitutes a commercially obtainable mirror and can take the form either of a disk-shaped piece of metal having a highly burnished reflective surface 56, or a glass article likewise provided with a reflective surface 56 and a relieved beveled edge as at 57.

The mirror 54 is received in a lower housing member constituting the part 53 and more specifically comprising a sheet form member shaped to provide a continuous bottom wall 58 peripherally flanged as at 59 and having a plurality of lugs 60 for developing a retaining function with the part 52.

The part 52 comprises a tubular conduit 61 of a specified outer diameter 62 and including near one end thereof an externally threaded portion 63. The conduit 61 has a central passage 64. At one end thereof, the conduit 61 is integrated in firm assembly with an intermediate housing member having an upper wall 66, a peripheral flange 67 and an arcuate forward edge 68 having a radius of curvature generally similar to the radius of curvature of the disk-shaped mirror 54.

The part 52 further includes a lower wall 69 which is firmly attached in sealed-together assembly with the peripheral flange 67 and which further includes an inclined portion 70 angled towards the upper wall 66 to provide a forward lip 71, likewise curved to the same curvature as the forward edge 68 and together therewith forming a slit-like opening 72 for a plenum chamber 73 which is formed because of the connected-together relationship of the upper wall 66 and the lower wall 69. Thus, air conducted through the central passage 64 of the conduit 61 from a source at increased pressure to the plenum chamber 73 will be discharged in the form of a thin jet stream out of the opening 72 at the curved forward edge 68.

The part 51 includes a tubular sleeve having an inner passage with a diameter shown at 73 and which diameter 73 is larger than the diameter 62 so that upon telescoping assembly of the sleeve with the conduit 61 there will be formed an annular passage 74 (FIGURE 7).

The free end of the sleeve designated at 76 is shown at 77 and is curved or tapered somewhat radially inwardly, thereby to provide a camming or abutment surface cooperable with a shoulder 78 formed inwardly of a knurled nut 79 formed as a part of a shank portion 80 of the dental instrument, the nut 79 having an internally threaded portion 81 for threadedly engaging the threaded portion 63 on the conduit 61.

The sleeve 76 is provided with a plurality of openings 82 which communicate the annular passage 74 with the atmosphere.

At the opposite end of the sleeve 76, there is formed an upper housing member including an upper wall 83 connected in sealed-together assembly with the end of the sleeve 76 and having a peripheral flange 84. The upper wall 83 is cut out to provide a curved forward edge 86.

When the dental instrument 50 is disassembled as in the exploded view of FIGURE 9, all of the parts present clean, unobstructed surfaces which may be readily cleared of any residual foreign matter and all of the parts are made of sturdy components which are easy to sterilize by conventional sterilizing techniques and procedures.

The lugs 60 on the bottom housing part 53 are bent over in spaced relation to the bottom wall 53. The spacing dimension is slightly in excess of the spacing dimension of the flange 67 on the part 52. Accordingly, when the part 52 is positioned with the upper wall thereof 66 under the lugs 60, the part 52 will be clamped in firm engagement with the bottom housing part 53.

The mirror 54 is then conveniently inserted with one edge under the forward curved edge 68 and falls in place in the bottom housing part 53. It will be noted upon referring to FIGURE 10 that the mirror part 54 and the bottom housing part 53 are shaped of conforming configurations. Referring specifically to FIGURE 8 in connection with FIGURE 10, it should be noted that the upper wall 66 overlies the reflective surface 56 of the mirror so that at least a portion of the slit-like opening 72 is in virtual planar register with the reflective surface 56 of the mirror 54. Accordingly, when air from a source at increased pressure is supplied to the plenum chamber 73, an air curtain will be established across the reflective surface 56 of the mirror 54.

It should be particularly noted also upon referring to FIGURE 10, that the intermediate housing part 52 has its peripheral flange 67 spaced slightly inwardly of the flange 53, thereby to form a passage or relief 87 around the intermediate housing part 52.

Also, the wall 69 is spaced from the wall 58, thereby to form a clearance space 88 beneath the intermediate housing part 52 and behind the mirror 54.

The sleeve 76 is then telescoped over the conduit 61 whereupon the upper housing portion of the part 51 is positioned superjacent the subassembly shown in FIGURE 10 and the flange 84 snugly engages the outer surface of the flange 59 on the lower housing part. The forward edges of the upper wall 83, and particularly such portions as extend forwardly of the curved forward edge 86, are bent downwardly as at 90, thereby to form abutment shoulders for engaging against the outer peripheral edge of the adjoining reflective surface of the mirror part 54. Also, the offset portions 90 serve to space the upper wall 83 in spaced relation to the upper wall 66 of the intermediate housing part 52, thereby forming a passage or a relief 91 in communication with the annular passage 74.

Note particularly that the form of the offset portions 90, as shown in FIGURE 8, permits the relief or passage 91 to extend forwardly under the entire top wall 83 of the upper housing part 51.

When the upper housing part 51 is positioned with the conduit member 61 telescoped in the sleeve 76, the knurled nut 79 is threadedly engaged with the intermediate housing part 52, whereupon the shoulder 78 will cam or engage the abutment 77 and the parts will be drawn into connected-together firm assembly, as shown in FIGURES 6, 7 and 8.

As previously described in the form of the invention shown in FIGURES 1–5, a suitable valve mechanism is associated with the shank 80 of the dental instrument 50 whereupon air from a source at increased pressure will be conducted through the passage 64 of the conduit 61 to the plenum chamber 73, whereupon a shield of air will be directed across the upper reflective surface 56 of the mirror 54.

As in the form of the invention already described in connection with FIGURES 1–5, the pressure conditions produced by the high velocity of the air as it emanates from the slit-like passage 72, produces a vacuum condition adjacent the slit-like opening 72. Since the edges of the relief or passage 91 are in immediate adjacency thereto, the vacuum condition will tend to evacuate the relief or passage 91, thereby tending to draw a vacuum from the relief or passage 91, as well as the relief or passage 87 and the relieved area 88 in all the areas adjacent the mirror 54, both behind the mirror, as well as alongside and above and below the mirror. It is apparently this action which improves the air shielding and overcomes the problem created by the venturi action of the nozzle wherein the vacuum may tend to permit water or other materials to collect on the mirror face 56. Since the relief or passage 91 communicates with the annular passage 74, the vacuum action is effective to draw air constantly through the passage 74 and through the openings 82, as well as from the areas adjacent the mirror 54. All of such action improves the baffling function of the air shield.

Although I have herein set forth and described my invention with respect to certain specific principles and details thereof, it will be understood that these may be varied without departing from the spirit and scope of the invention, as set forth in the hereunto appended claims.

I claim as my invention:

1. In a dental mirror, a nozzle receiving air from a source at increased pressure having an inlet at one end thereof and a plurality of outlet passages diverging from said inlet, a mirror on said nozzle in parallel relationship with said outlet passages, said outlet passages being disposed to project a fan-shaped air curtain over said mirror and in proximately spaced relationship to said mirror and conduit means extending beneath the mirror into proximately spaced relation to the ends of said outlet passages such as to conduct air from beneath the mirror by a vacuum created by said air curtain.

2. A dental device comprising a handle having an air passage formed therein, a valve in said air passage, a valve fitting connected to said handle, means for manually operating said valve in said valve fitting, said valve fitting having an air passage controllably communicating with the air passage in said handle, a nozzle connected to said valve fitting having an inlet portion connecting with the air passage in said valve fitting and a plurality of laterally spaced, relatively reduced outlet openings extending into said nozzle in common flow communication with said inlet passage and a mirror fastened to the end of said nozzle in substantially parallel relationship to said outlet passages whereby the outlet passages are adapted to provide series of air jets forming a protective fan-shaped air shield over said mirror, said outlet passages terminating in proximate spaced relation to said mirror such as to form vacuum means drawing air from beneath the mirror when said air shield is projected over said mirror and conduit means leading the air from beneath said mirror to said air jets.

3. In a dental mirror, a nozzle receiving air from a source at increased pressure and having an inlet at one end thereof and an end wall with a row of spaced apart outlet openings formed therein said nozzle having a plurality of diverging outlet passages leading from the inlet to said outlet openings, a shielf extending from said end wall in parallel relation to said outlet passages, a bracket shelf, a mirror on said bracket shelf having an upper mirror face parallel to said shelf extending from said end wall in proximate relation thereto, conduit means formed in said bracket shelf for leading air from beneath said mirror and a plurality of flow passages formed in said shelf adjacent said nozzle wall and leading from said conduit in said bracket shelf in perpendicular relation to the outlet passages and terminating in predetermined proximate relationship thereto such that a vacuum formed by passage of air from said outlet passages will draw air from beneath the mirror through said conduit in said bracket shelf and said flow passages to the air stream from said outlet passage.

4. In a dental mirror, a nozzle receiving air from a source at increased pressure and having an inlet at one end thereof and an end wall with a row of spaced apart outlet openings formed therein said nozzle having a plurality of diverging outlet passages leading from the inlet to said outlet openings, a shelf extending from said end wall in parallel relation to said outlet passages, a bracket shelf, a mirror on said bracket shelf having an upper mirror face parallel to said shelf extending from said end wall in proximate relation thereto, and in parallel coplanar relationship to said outlet passages, conduit means formed in said bracket shelf for leading air from beneath said mirror, a plurality of flow passages formed in said shelf adjacent said nozzle wall and leading from said conduit in said bracket shelf in perpendicular relation to the outlet passages and terminating in predetermined proximate relationship thereto such that a vacuum formed by passage of air from said outlet passages will draw air from beneath the mirror through said conduit in said bracket shelf and said flow passages to the air stream from said outlet passage and a hood overlying said outlet passages opening in the direction of said mirrors.

5. In a dental mirror, a nozzle receiving air from a source at increased pressure having an air inlet at one end thereof a nozzle manifold projecting slightly outwardly therefrom and a bracket shelf displaced below said outwardly extending manifold, a mirror on said bracket shelf in proximate parallel coplanar relation to said outwardly extending manifold, a conduit formed in said bracket shelf extending beneath said mirror, and a manifold extending upwardly from said bracket shelf and in communication with said conduit beneath said mirror, said manifold being in perpendicular relationship to said outwardly extending manifold and in proximately spaced relationship therebelow whereby the vacuum created by air passing from the outwardly extending manifold will be effective to draw air through the conduit beneath said mirror and through the upwardly extending manifold.

6. In a dental mirror, a nozzle receiving air from a source at increased pressure having an air inlet at one end thereof a nozzle manifold projecting slightly outwardly therefrom and a bracket shelf displaced below said outwardly extending manifold, a mirror on said bracket shelf in proximate parallel relation to said outwardly extending manifold, a conduit formed in said bracket shelf extending beneath said mirror, and a manifold extending upwardly from said bracket shelf and in communication with said conduit beneath said mirror, said manifold being in perpendicular relationship to said outwardly extending manifold and in proximately spaced relationship therebelow whereby the vacuum created by air passing from the outwardly extending manifold will be effective to draw air through the conduit beneath said mirror and through the upwardly extending manifold, the passages in the outwardly extending manifold diverging in fan-shaped relationship outwardly to direct a shield across the mirror of a character such as to prevent water, mist and other materials from forming on the mirror face.

7. In a dental mirror, a nozzle receiving air from a source at increased pressure having an inlet and an outlet and a passage therebetween, a mirror and means on said nozzle carrying said mirror in forwardly spaced relationship to said outlet thereof, said nozzle being disposed to project an air curtain in substantially parallel relationship over said mirror and means coacting with said nozzle and said spaced mirror to form a venturi means drawing air rearwardly toward said nozzle and from beneath said mirror from the front end to the rear end thereof and then upwardly to said air curtain.

8. In a dental mirror, means forming a nozzle connected to an air passage and receiving air from a source at increased pressure, said nozzle having an outlet forming an air curtain projected on a plane, a mirror having a reflective surface in parallel relationship to said plane, whereby said air curtain will be projected over said reflected surface and in proximately spaced relationship thereto, and passage means independent of said air passage having openings formed adjacent the mirror and extending into proximately spaced venturi relation to said outlet such as to conduct air from areas adjacent the mirror but remote to said outlet by the vacuum created by said air curtain.

9. In a dental mirror as defined in claim 8, said passage means including a handle for said nozzle whereby at least a portion of the air drawn by the vacuum created by said air curtain will be drawn from areas adjacent the handle.

10. A dental device comprising a handle having an air passage formed therein for connection to a source of air at increased pressure, a valve in said air passage, a valve fitting connected to said handle, means for manually operating said valve and said valve fitting, said valve fitting having an air passage controllably communicating with the air passage in said handle, a nozzle connected to said valve fitting having an inlet portion connected with the air passage in said valve fitting and an outlet means in flow communication with said inlet passage, and a mirror fastened to the end of said nozzle in substantially parallel relationship to said outlet means and cooperating with said outlet means, whereby said outlet means provides an air jet stream forming a protective air shield over said mirror, and means forming passages separate from said air passage and in venturi relation with said outlet means and having openings for leading air from areas remote to said outlet means to said jet stream to enhance the shielding action.

11. A dental device as defined in claim 10, said means forming separate passages including passages leading air from adjacent the mirror.

12. A dental device as defined in claim 10, said means forming separate passages including a separate passage extending into said handle and having an opening to atmosphere, thereby to lead air from adjacent the handle to said jet stream.

13. In a dental mirror, a nozzle receiving air from a source at increased pressure having an inlet and an outlet and a passage therebetween, a mirror and means on said nozzle carrying said mirror in forwardly spaced relationship to said outlet, said nozzle being disposed to project an air curtain in substantially parallel relationship over said mirror and means coacting with said nozzle and said spaced mirror to form an air drawing means drawing air from the areas adjacent the mirror, thereby to improve the shielding action of the air curtain.

14. In a dental mirror as defined in claim 13, said air drawing means comprising a bracket shelf having portions spaced from the bottom wall of the mirror to form a passage and conduit means communicating said passage with the outlet end of said nozzle.

15. In a dental mirror as defined in claim 13, said air drawing means comprising upper, lower and intermediate housing parts together forming a support for said mirror and forming relief passages extending from adjacent the mirror to the outlet end of the nozzle.

16. In a dental instrument, a mirror having a planar reflective surface, nozzle means for connection to a source of air at increased pressure having a jet forming outlet means adjacent said mirror to form an air curtain shield superjacent said planar reflective surface, and air drawing passage means communicating with the area adjacent said outlet means in a venturi relation for producing a vacuum effect, said air drawing passage means communicating further with other areas remote from said outlet means but adjacent the mirror, thereby tending to draw air from around the mirror and improving the baffling action of the air curtain shield.

17. A dental instrument comprising upper, lower and intermediate housing parts, said intermediate housing part having formed therein a plenum chamber communicating with a source of air at increased pressure and an arcuate slit-like outlet opening for said plenum chamber, a mirror carried by said lower housing part and having a reflective surface mounted in register with said slit-like opening, whereby an air curtain is projected outwardly of said slit-like outlet at high velocity over said reflective surface, said housing parts together forming passages in venturi relation to said outlet and subject to the suction action produced by the high velocity air curtain, thereby to draw air from areas remote from said outlet opening and improving the baffling action of the air curtain.

18. A dental instrument as defined in claim 17, said upper and intermediate housing parts having outer and inner telescopically related tubular stems, said inner stem forming a passage leading to said plenum chamber for conducting pressurized air thereto, said inner and said outer stem together forming an annular passage communicating with said passages, and openings formed in said outer stem whereby air drawn into said additional passages will be at least partially drawn through said openings in said outer stem.

19. In a dental mirror, a nozzle receiving air from a source at increased pressure and having an inlet and an outlet and a passage therebetween, a mirror and means on said nozzle carrying said mirror in forwardly spaced relationship to said outlet, said nozzle being disposed to project an air curtain in substantially parallel relationship over said mirror, and means coacting with said nozzle and with said spaced mirror to form an air drawing means drawing air from areas remote to said air outlet including areas adjacent the mirror, thereby to improve the shielding action of the air curtain.

References Cited in the file of this patent
UNITED STATES PATENTS

| | | |
|---|---|---|
| 1,925,981 | Hopkins | Sept. 5, 1933 |
| 2,907,110 | O'Hara | Oct. 6, 1959 |